(No Model.)
G. BARR.
ROTARY ENGINE.
No. 367,177. Patented July 26, 1887.
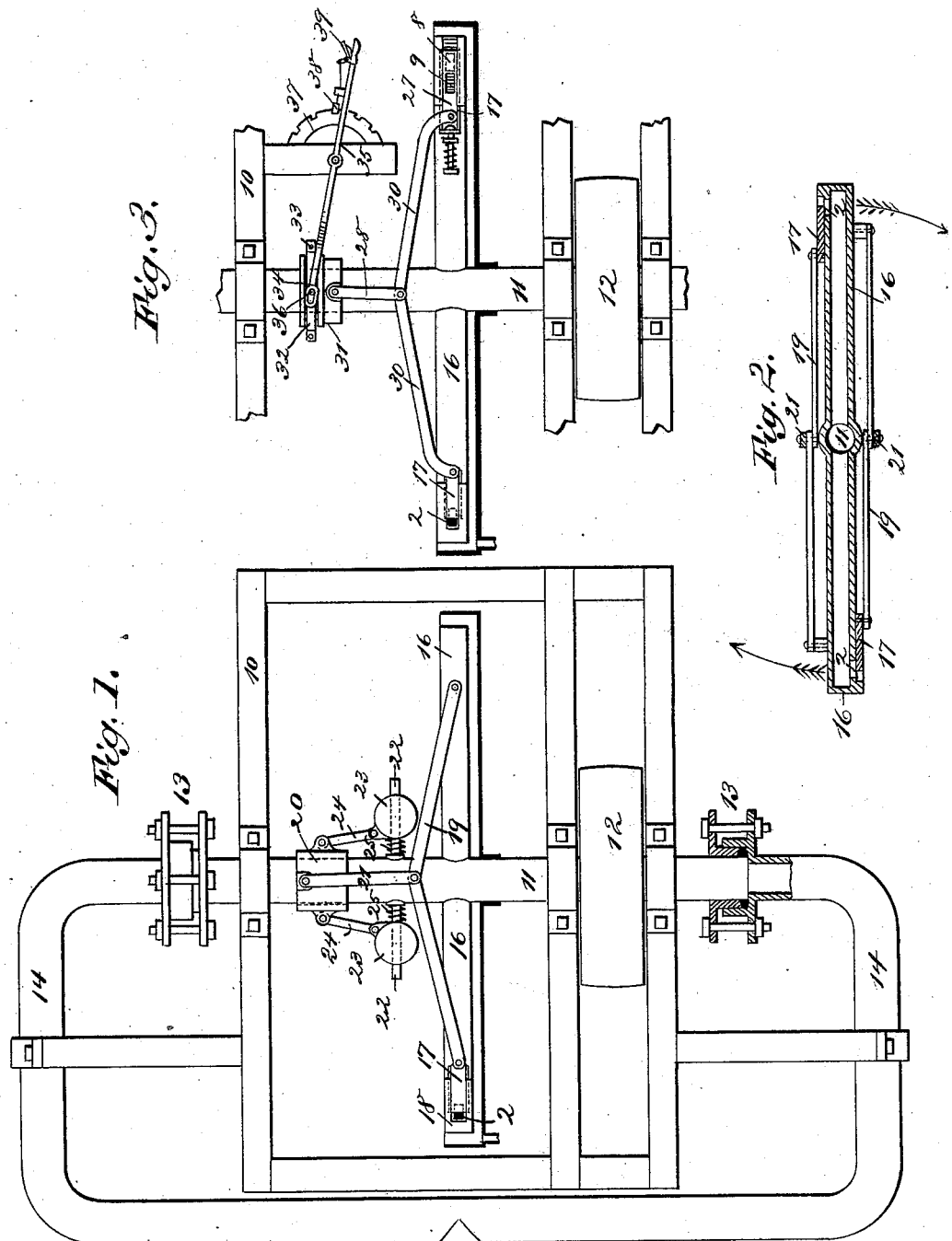
WITNESSES:
INVENTOR:
G. Barr
BY Munn & Co.
ATTORNEYS.

UNITED STATES PATENT OFFICE.

GEORGE BARR, OF LA CENTER, WASHINGTON TERRITORY.

ROTARY ENGINE.

SPECIFICATION forming part of Letters Patent No. 367,177, dated July 26, 1887.

Application filed October 23, 1886. Serial No. 217,032. (No model.)

*To all whom it may concern:*

Be it known that I, GEORGE BARR, of La Center, in the county of Clarke and the Territory of Washington, have invented a new and Improved Rotary Engine, of which the following is a full, clear, and exact description.

This invention relates to the construction of a novel form of rotary engine which may be driven either by steam or water pressure, the action of the engine depending upon the well-known law that the pressure of a liquid or of steam confined in a vessel is equal upon all sides of the vessel.

The invention consists, essentially, of a hollow revoluble shaft carrying a hollow cross arm or tube the ends of which are closed, and which is provided with side ports, said ports passing through opposite sides of the arm near either end thereof; and the invention further consists of certain novel constructions and combinations, to be hereinafter described, and specifically pointed out in the claims.

Reference is to be had to the accompanying drawings, forming a part of this specification, in which similar figures of reference indicate corresponding parts in all the views.

Figure 1 is a side view of my improved form of engine. Fig. 2 is a longitudinal sectional view of the cross arm and its connections, and Fig. 3 is a view of a construction wherein the parts are so arranged that the engine may be run in either direction.

In constructing such an engine as the one forming the subject-matter of this application, I provide a main supporting-frame, 10, in which there is mounted a hollow shaft or tube, 11, which carries a driving-pulley, 12. The shaft or tube 11 is connected by suitable couplings, 13, with the branch arms 14 of a supply-pipe, 15. To this shaft 11 there is rigidly connected a cross arm or tube, 16, the bore of which communicates with the bore of the central shaft or tube. This cross-arm 16 is formed with closed ends and with ports 2, said ports being upon opposite sides of the arm and near either end thereof.

In connection with each port there is arranged a slide-valve, 17, the edges of which are beveled in order to fit in beveled grooves 18, that are formed upon the sides of the arm. In connection with each slide there is arranged a toggle lever, 19, one end of the toggle-lever being pivotally connected to the end of arm 16 opposite to that in connection with which its slide is arranged, while the other end of the lever is pivotally connected to the slide. The central joints of the levers 19 are connected with a sleeve, 20, which is mounted upon the shaft 11, this connection being established through the medium of a link, 21.

Just above the arm 16 the shaft or tube 11 carries two outwardly-extending rods or bars, 22, upon which there are mounted balls 23, said balls being connected with the sleeve 20 by means of links 24, while between the balls and the shaft there are arranged springs 25, the arrangement being such that as the speed of the shaft increases the balls will be thrown outward from the shaft. The sleeve 20 will be thereby lowered and the slide-valves 17 thrown outward to close their ports.

In operation steam or water under pressure is admitted through the pipe 15, and thence through the arms 14, leading from said pipe, will enter the bore of the shaft 11, passing thence into the bore of the arm 16. In entering the arm 16 the pressure of the water or steam would be equal upon all sides of the arm were it not for the ports 2; but owing to these ports the pressure at that point will be *nil*, and consequently the pressure upon the side opposite to the ports will overbalance the pressure upon the side where the ports are located, and thus the arm will be moved in the direction of the arrows shown in connection therewith in Fig. 2, and, so moving, will impart a rotary motion to the shaft 11, which motion may be transmitted through proper belting applied to the pulley 12. As the speed of the shaft increases the governor, made up of the sleeve, balls, and connections, hereinbefore described, will act to partially close the ports, thus tending to equalize the pressure upon the two sides of the arms, and hence the speed will be diminished.

In Fig. 3 I illustrate a construction whereby the shaft 11 may be made to revolve in either direction, this object being accomplished by forming the arm 16 with two ports at each end. The ports 2 are closed by valves 17, arranged as hereinbefore described; but the ports 8 upon the same sides of the arm are closed by valves 27, each of which is formed with a central opening, 9. The valves 17 and 27 are connected with a central link, 28, by links 30, the link 28 being connected with a collar or sleeve, 31, which is formed with an annular groove, 32, in which there is arranged a yoke, 33, said yoke being engaged upon either side by arms 34 of a lever, 35, said arms 34 being slotted to engage with pins 36, that extend outward from the yoke. The lever 35 is pivotally connected to the frame 10 and arranged so that it may be locked in any position required, this adjustment of the lever being brought about by means of a toothed rack, 37, that is engaged by a bolt, 38, that is operated by an end piece, 39, as clearly shown. From this arrangement it will be seen that if the lever 35 should be thrown so as to force the lever 31 downward the port 2 would be closed and the port 8 would be opened, for as the sleeve moves downward the valves will be moved outward toward the ends of the arm 16, and as the valve 27 moves outward its opening 9 will be brought in register with the port 8 of the arm 16, the valve 17 coming in contact with the end of its seat and acting as a stop for arm 30, and it will also be seen that the speed may be regulated as desired.

Having thus fully described my invention, I claim as new and desire to secure by Letters Patent—

1. In a rotary engine, the combination, with a hollow shaft having a hollow cross arm provided with ports, of the valves applied to said ports, and the toggle-links connected to said valves, one link permitting of the closing of one valve and another or fellow link having its one or distant end adapted to remain stationary during the closing of said valve, substantially as and for the purpose set forth.

2. In a rotary engine, the combination, with a hollow shaft having a hollow cross-arm provided with arms having ports, of valves applied to said ports, and the links connected to said valves, one link permitting of the closing of one valve and another link adapted to open another valve after the closing of the aforesaid valve, substantially as and for the purpose set forth.

3. In a rotary engine, the combination, with a supporting-frame, of a hollow shaft, 11, mounted in bearings 13, a supply-pipe, 15, having branch arms 14, that are also connected to the bearings 13, a hollow cross-arm, 16, formed with ports 2, valves 17, toggle-levers 19, a sleeve, 20, connecting-links 21, rods or bars 22, balls 23, and links 24, all substantially as described.

4. In a rotary engine, the combination, with a central shaft, of a hollow arm connected thereto and in communication with the bore of the shaft, a water or steam supply attachment, valves, as 17 and 27, arranged, respectively, in connection with ports 2 and 8 of the cross-arm, a sleeve, 31, connection between the sleeve and the valve, and an operating-lever arranged in connection with the sleeve, substantially as described.

GEORGE BARR.

Witnesses:
HENRY HERROLD,
HENRY HOBERT.